United States Patent [19]
Tetsuaki

[11] Patent Number: 5,442,270
[45] Date of Patent: Aug. 15, 1995

[54] ADAPTIVE SLIDING MODE CONTROL METHOD FOR OBJECT OF CONTROL INCLUDING SPRING SYSTEM

[75] Inventor: Kato Tetsuaki, Oshino, Japan

[73] Assignee: Fanuc Ltd., Yamanashi, Japan

[21] Appl. No.: 129,084

[22] PCT Filed: Jan. 19, 1993

[86] PCT No.: PCT/JP93/00056

§ 371 Date: Oct. 6, 1993

§ 102(e) Date: Oct. 6, 1993

[87] PCT Pub. No.: WO93/16423

PCT Pub. Date: Aug. 19, 1993

[30] Foreign Application Priority Data

Feb. 6, 1992 [JP] Japan .................. 4-056344

[51] Int. Cl.$^6$ ............................................. G05B 19/405
[52] U.S. Cl. .................. 318/568.22; 318/610
[58] Field of Search ........... 318/568.1, 568.11, 568.22, 318/610, 609, 611; 901/9, 20, 24; 364/164, 165

[56] References Cited
U.S. PATENT DOCUMENTS 5,216,342 6/1993 Torii et al. ................. 318/568.11 X
5,341,078 8/1994 Torii et al. ................. 318/610 X

FOREIGN PATENT DOCUMENTS

3-058106 3/1991 Japan .
3-152608 6/1991 Japan .
3-180903 8/1991 Japan .

*Primary Examiner*—William M. Shoop, Jr.
*Assistant Examiner*—Brian Sircus
*Attorney, Agent, or Firm*—Staas & Halsey

[57] ABSTRACT

The present invention provides an adaptive sliding mode control method capable of not only improving the convergence of estimated parameters but also providing outstanding vibration-damping properties. In this method, a position deviation $\epsilon$ between a command position and a motor position, a speed deviation $\dot{\epsilon}$, and a position command acceleration $\ddot{\theta}r$ are determined. The difference $\epsilon t$ between the motor position and the position of machine's moving part and a differential $\dot{\epsilon}t$ based thereon are obtained by observer processing and filtering processing. A phase plane Suf of the motor is obtained by feeding back the deviation $\epsilon t$ between the motor position and the position of the machine's moving part. Estimated values Jhat, Ahat and Grhat, representing an inertia term, coefficient of dynamic friction, and gravity term respectively, are obtained. A switching input $\tau 1$ is set to the maximum Dis or minimum Dis of a disturbance depending on the plus/minus sign of the phase plane Suf. A torque command $\tau$ for the motor is obtained and delivered to a current loop. With this method, the vibration of the machines moving part after positioning can be reduced.

4 Claims, 6 Drawing Sheets

FIG. 7(a) MOTOR POSITION

FIG. 7(b) MOTOR SPEED

FIG. 7(c) ARM POSITION

FIG. 7(d) ARM SPEED

FIG. 7(e) J HAT

FIG. 7(f) A HAT

FIG. 7(g) Gr HAT

FIG. 7(h) $\tau$

ADAPTIVE SLIDING MODE CONTROL METHOD FOR OBJECT OF CONTROL INCLUDING SPRING SYSTEM

TECHNICAL FIELD

The present invention relates to a control method for object of control including spring system, such as a robot driven by a servomotor, more particularly to an adaptive sliding mode control method for object of control.

BACKGROUND ART

In controlling a machine or the like driven by a servomotor, linear control, such as PI (proportional-plus-integral) control, is employed assuming the machine, as an object of control, to be a non-spring system such as a rigid body.

However, since a robot is generally constructed in the form of a cantilever, it undergoes a large variation of inertia depending on the attitude of the robot, accompanying the change in the response of a servo system. Moreover, a robot has a low rigidity and resulting low resonance frequency due to the effects of the spring element such as the speed reducer and others, and so, in positioning the distal end (tool center point) of a robot, the end of the robot tends to sway even after positioning by servomotor. Conventionally, therefore, variations in the spring system and inertia due to the low rigidity of the robot have been ignored, and instead, the servo gain is reduced for the control, or a timer is activated after the positioning so that operation is performed after the vibration of the distal end of the robot is stopped following the passage of a predetermined period of time.

Thus, the present inventors have proposed inventions in which sliding mode control is applied to a control object driven by a servomotor, in order to prevent a moving part of a machine from vibrating (See Publication JP-A-3-92911 and JP-A-3-118618).

It is known that a combination of the sliding mode control and adaptive control is highly useful, since it provides very high robust properties (i.e., high resistance to parameter variations and high disturbance restraining capability). If this technique is applied to a machine of flexible structure such as a robot, however, estimated parameters (inertia, coefficient of dynamic friction, gravity term, etc. of the control object) will not converge properly, thereby causing the vibration of machine's moving parts.

DISCLOSURE OF THE INVENTION

Thus, the object of the present invention is to provide an adaptive sliding mode control method capable of improving the convergence of the aforesaid estimated parameters, as well as capable of providing an excellent vibration-damping effect.

In order to achieve the above object, an adaptive sliding mode control method according to the present invention is arranged so that the difference between the position of a servomotor and the position of a moving part of an object of control driven by the servomotor is fed back to a phase plane for sliding mode control, and a torque command for the servomotor is controlled so that the value of the phase plane converges to 0.

Preferably, in an adaptive sliding mode control method, a phase plane Suf for sliding mode control is given by $$Suf = \dot{\epsilon} + Kp \cdot \epsilon - K1 \cdot \epsilon t,$$

where $\epsilon$ is a position deviation between a command position and the position of a servomotor; $\dot{\epsilon}$ is a speed deviation; $\epsilon t$ is the difference between the position of the servomotor and the position of a moving part of an object of control driven by the servomotor; Kp is a position loop gain; and K1 is a feedback gain of the difference between the position of the servomotor and the position of the moving part of the object of control driven by the servomotor.

A torque command $\tau$ for the servomotor is obtained in accordance with $$\tau = K2 \cdot Suf + Jhat(\ddot{\theta}r - Kp^2\epsilon + Kp \cdot K1 \cdot \epsilon t - K1 \cdot \dot{\epsilon}t\\) + Ahat \cdot \dot{\theta} + Grhat + \tau 1,$$

where Jhat, Ahat, and Grhat are estimated values of an inertia term, a coefficient of dynamic friction, and a gravity term, respectively; $\dot{\theta}r$ and $\ddot{\theta}r$ are a position command speed and acceleration, respectively; $\dot{\epsilon}t$ is the differential of the difference between the position of the servomotor and the position of the moving part of the control object driven by the servomotor; and $\tau 1$ is a switching input, the switching input being adjusted to the maximum value of a disturbance when the value of the phase plane Suf is not smaller than 0, and to the minimum value of the disturbance when the value of the phase plane Suf is smaller than 0. K2 is a constant, as described later.

The difference $\epsilon t$ between the position of the servomotor and the position of the moving part of the object of control driven by the servomotor and the differential $\dot{\epsilon}t$ thereof are obtained by observer processing.

According to an aspect of the present invention, adaptive sliding mode control comprising the following processings is applied to a robot which is regarded as an object of control including a spring system. That is, the control comprises: setting and entering, in a memory of a servo circuit, various constants required for a sliding mode control processing and observer processing, besides the maximum value Dis(max) and minimum value Dis(min) of a foreseen disturbance; starting the operation of the robot, reading a position command $\theta r$ and a position feedback amount $\theta$ with every period, and calculating a motor speed $\dot{\theta}$, a command speed $\dot{\theta}r$, a command acceleration $\ddot{\theta}r$, a position deviation $\epsilon$ equivalent to the difference between the position command $\theta r$ and the position feedback amount $\theta$, and a speed deviation $\dot{\epsilon}$ on the bases of the read values; executing observer processing in accordance with the obtained motor speed $\dot{\theta}$ to obtain an estimated torsion $\epsilon tf$ and an estimated torsional speed $\dot{\epsilon}tf$ between a motor and the distal end of the robot, further subjecting these deviations to filtering processing based on a transfer function, and obtaining a filtered estimated torsion $\epsilon t$ and a filtered estimated torsional speed $\dot{\epsilon}t$ between the motor and the distal end of the robot; obtaining a phase plane Suf in accordance with the position deviation $\epsilon$, the speed deviation $\dot{\epsilon}$, and the filtered estimated torsion $\epsilon t$ between the motor and the distal end of the robot; obtaining an estimated value Grhat of a gravity term in accordance with the obtained phase plane Suf, an estimated value Ahat of a coefficient of dynamic friction in accordance with the phase plane Suf and the motor speed $\dot{\theta}$, and an estimated value Jhat of an inertia term in accordance with the phase plane Suf, position deviation $\epsilon$, command acceleration $\ddot{\theta}r$, estimated torsion $\epsilon t$, and estimated torsional speed $\dot{\epsilon}t$; determining whether or not the value of the phase plane Suf is not smaller than 0 so that a switching input $\tau 1$ can be adjusted to the maximum value Dis(max) of the disturbance inputted in advance when the value is not smaller than 0, as well as so that the switching input $\tau 1$ can be adjusted to the minimum value Dis(min) of the disturbance inputted in advance when the value is smaller than 0; obtaining a torque command $\tau$ for the motor in accordance with the motor speed $\dot{\theta}$, position deviation $\epsilon$, command acceleration $\ddot{\theta}r$, filtered estimated torsion $\epsilon t$, filtered estimated torsional speed $\dot{\epsilon}t$ between the motor and the distal end of the robot, phase plane Suf, estimated value Jhat of the inertia term, estimated value Ahat of the coefficient of dynamic friction, estimated value Grhat of the gravity term, and switching input $\tau 1$; and delivering the obtained torque command to a current loop of the servo circuit.

According to the present invention, as described above, the difference between the position of the servomotor and the position of the moving part of the object of control driven by the servomotor is fed back to the phase plane for sliding mode control; the torque command for the motor is calculated so that the value of the phase plane converges to 0; and the servomotor is driven in accordance with this torque command. Thus, the vibration of the moving part of the object of control after positioning is reduced.

BEST MODE OF CARRYING OUT THE INVENTION

First, the difference between the position of a motor and the position of machines moving part (distal end position of a robot), that is, a torsion $\epsilon t$ (more specifically, a value obtained by multiplying an estimated position deviation by a transfer function $(S+Kp)/(S+A)$, as will be mentioned later), is fed back to a phase plane Surf for sliding mode control. This phase plane is given by the following equation (1). Further, the following equation (2) is an equation for the motion of an object of control such as the robot.

$$Suf = \dot{\epsilon} + Kp \cdot \epsilon - K1 \cdot \epsilon t \qquad (1)$$

$$\tau = J \cdot \ddot{\theta} + A \cdot \dot{\theta} + Gr + Dis. \qquad (2)$$

In the above equations (1) and (2), $\epsilon$ is a position deviation equivalent to the difference between a command position of the motor and the actual position of the motor, and $\theta$ is the actual position of the motor. Further, Kp is a position loop gain; K1 is a feedback gain of the torsion $\epsilon t$ of the machine or control object, which is a state quantity; $\tau$ is a torque; J is inertia; A is a coefficient of dynamic friction; Gr is a gravity term; and Dis is a disturbance.

If the command position for the motor is $\theta r$, the following equations hold.

$$\epsilon = \theta r - \theta,$$

$$\dot{\epsilon} = \dot{\theta}r - \dot{\theta},$$

$$\ddot{\epsilon} = \ddot{\theta}r - \ddot{\theta}. \qquad (3)$$

The torque command $\tau$ for the motor is given by the following equation.

$$\tau = K2 \cdot Suf + Jhat(\ddot{\theta}r - Kp^2 \epsilon + Kp \cdot K1 \cdot \epsilon t - K1 \cdot \dot{\epsilon}t) + Ahat \cdot \dot{\theta} + Grhat + \tau 1 \qquad (4)$$

where K2 is a constant determined depending on the maximum value of the inertia in the manner mentioned later; Jhat is an estimated value of the inertia term; Ahat is an estimated value of the coefficient of dynamic friction; Grhat is an estimated value of the gravity term; and $\tau 1$ is a switching input.

Further, a Liapunov function candidate V is given by the following equation.

$$V = (\tfrac{1}{2})J \cdot Suf^2 + (\tfrac{1}{2})\alpha \cdot Jbar^2 + (\tfrac{1}{2})\beta \cdot Abar^2 + (\tfrac{1}{2})\gamma \cdot Grbar^2, \qquad (5)$$

where $\alpha$, $\beta$ and $\gamma$ are positive adjustment parameters for determining an adaptive speed; Jbar, Abar and Grbar are estimated errors of the inertia term, coefficient of dynamic friction, and gravity term, respectively, having relationships given by the following equations (6):

$$Jbar = J - Jhat,$$

$$Abar = A - Ahat,$$

$$Grbar = Gr - Grhat. \qquad (6)$$

The aforesaid Liapunov function candidate V is a function having a minimum value of 0 and being always positive. Thus, if the torque $\tau$ for the motor is given so that the differential $\dot{V}$ of the Liapunov function candidate V is always negative (and hence, V decreases monotonously), the Liapunov function candidate V converges to the minimum value or 0. Thus, we obtain Suf=0, Jbar=0, Abar=0, and Grbar=0, and an obtainable responsiveness dependent on a constant response function of Suf=0 but is independent of the parameters (inertia, coefficient of dynamic friction, and gravity term) of the control object, as in the case of the conventional sliding mode control. Each estimated error is reduced to 0, that is, each estimated value converges to its true value.

Differentiating both sides of the aforesaid equation (5), we obtain $$\dot{V} = J \cdot Suf \cdot \dot{Suf} + \alpha \cdot Jbar \cdot \dot{Jbar} + \beta \cdot Abar \cdot \dot{Abar} + \gamma \cdot Grbar \cdot \dot{Grbar}. \qquad (7)$$

Also, differentiating both sides of equation (1), we obtain $$S\dot{u}f = \ddot{\epsilon} + Kp\cdot\dot{\epsilon} - K1\cdot\dot{\epsilon}t. \tag{8}$$

Substituting equations (3) into equation (2) and solving the resulting equation with respect to $\ddot{\epsilon}$, we obtain $$\ddot{\epsilon} = \ddot{\theta}r + (A/J)\dot{\theta} + \{(Gr+Dis)/J\} - \tau/J. \tag{9}$$

Substituting equation (9) into equation (8) to obtain Suf and substituting it into equation (7), we obtain $$\dot{V} = Suf(J\cdot\ddot{\theta}r + A\cdot\dot{\theta} + Gr + Dis - \tau + J\cdot Kp\cdot\dot{\epsilon} - \tag{10}$$
$$J\cdot K1\cdot\dot{\epsilon}t) + \alpha\cdot Jbar\cdot\dot{J}bar + \beta\cdot Abar\cdot\dot{A}bar +$$
$$\gamma\cdot Grbar\cdot\dot{G}rbar.$$

Then, $\dot{\epsilon}$ is obtained from equation (1) and substituted into equation (10), while $\tau$ obtained from equation (4) is according to equations (6), and substituted into equation (10). Thereupon, the following equation is established.

$$\dot{V} = Suf^2(J\cdot Kp - K2) + Jbar\{Suf(\ddot{\theta}r - Kp^2\cdot\epsilon + \tag{11}$$
$$Kp\cdot K1\cdot\epsilon t - K1\cdot\dot{\epsilon}t) + \alpha\cdot\dot{J}bar\} +$$
$$Abar(Suf\cdot\dot{\theta} + \beta\cdot\dot{A}bar) + Grbar(Suf +$$
$$\gamma\cdot\dot{G}rbar) + Suf(Dis - \tau1).$$

Hereupon, a measure is taken for making the differential $\dot{V}$ of the aforesaid Liapunov function candidate always negative.

First, in order to make the first term of the right side of equation (11) negative, it is sufficient that $$J\cdot Kp - K2 < 0$$

be established. Thus, the first term of equation (11) can always be made negative where the factor K2 is adjusted to a value obtained by multiplying the maximum J(max) of the inertia by the position loop gain Kp as follows:

$$K2 = J(\text{max})\cdot Kp. \tag{12}$$

Further, the second term of the right side of equation (11) is set to 0. More specifically, we have $$Suf(\ddot{\theta}r - Kp^2\cdot\epsilon + Kp\cdot K1\cdot\epsilon t - K1\cdot\dot{\epsilon}t) + \alpha\cdot\dot{J}bar = 0. \tag{13}$$

Accordingly, we obtain $$\dot{J}bar = -(1/\alpha)Suf(\ddot{\theta}r - Kp^2\cdot\epsilon + Kp\cdot K1\cdot\epsilon t - K1\cdot\dot{\epsilon}t). \tag{14}$$

Furthermore, if the equation (b) "Jbar=J−Jhat" is differentiated to obtain $\dot{J}=0$, that is, if the inertia J is constant, we have $$\dot{J}bar = -\dot{J}hat,$$

so that the aforesaid equation (14) is transformed as follows:

$$\dot{J}hat = (1/\alpha)Suf(\ddot{\theta}r - Kp^2\cdot\epsilon + Kp\cdot K1\cdot\epsilon t - K1\cdot\dot{\epsilon}t). \tag{15}$$

Likewise, if the coefficient of dynamic friction A and the gravity term Gr are supposed to be constant, we have $\dot{A}=0$ and $\dot{G}r=0$. Differentiating equation (6), we obtain $$\dot{A}bar = -\dot{A}hat,$$
$$\dot{G}rbar = -\dot{G}rhat.$$

Also estimating the third and fourth terms of the right side of the aforesaid equation (11) at 0, we obtain, from $Suf\cdot\dot{\theta} + \beta\cdot\dot{A}bar = 0$, $$\dot{A}hat = (1/\beta)Suf\cdot\dot{\theta}, \tag{16}$$

from $Suf + \gamma\cdot\dot{G}rbar = 0$, $$\dot{G}rhat = (1/\gamma)Suf \tag{17}$$

Then, where the fifth term of the right side of equation (11) is made negative, $$Suf(Dis - \tau1) < 0. \tag{18}$$

In order for the aforesaid equation (18) to hold, where the maximum and minimum values of the disturbance are given as Dis(max) and Dis(min) respectively, if Suf≧0, then $$\tau1 = Dis(\text{max}) \tag{19}$$

if Suf<0, then $$\tau1 = Dis(\text{min}) \tag{20}$$

Thus, the differential of the Liapunov function candidate V can always be made negative as far as the torque command $\tau$ is given to the motor so that equation (19) or (20) holds on the bases of equations (12), (15), (16) and (17), as well as depending on whether the sign of Suf is plus or minus. That is, the estimated values Jhat, Ahat, and Grhat can be obtained by integrating equations (15), (16) and (17), respectively. The torque command $\tau$ for the motor can be obtained from equation (4) by adjusting the value (equation (12)) of the factor K2 to Kp·J(max) and adjusting the switching input $\tau1$ to Dis(max) or Dis(max) depending on whether the sign of Suf is plus or minus.

In obtaining the torque command $\tau$ from equation (4), the position deviation $\epsilon$ ($=\theta r - \theta$) between the command position $\theta r$ and the motor position $\theta$, a speed deviation $\dot{\epsilon}$ ($=\dot{\theta}r - \dot{\theta}$), a command speed $\dot{\theta}r$, and a command acceleration $\ddot{\theta}r$ can be detected by the command position and a pulse encoder attached to the motor, although the difference $\epsilon t$ between the motor position $\theta$ and the machine moving part position, and a speed deviation $\dot{\epsilon}t$ based thereon cannot be detected. Thereupon, the difference $\epsilon t$ and the speed deviation $\dot{\epsilon}t$ are estimated by an observer.

Figure 2:
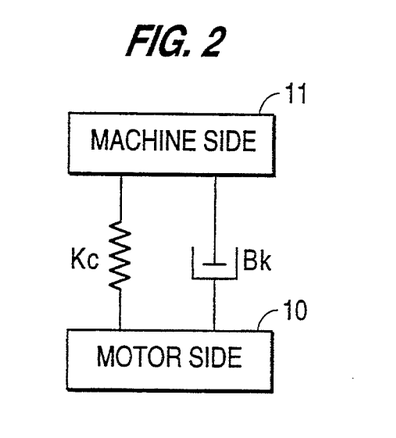
FIG. 2 is a model block diagram showing a spring model as an object of control.

FIG. 2 shows a model of the robot. The observer will be considered with reference to this model.

In FIG. 2, numerals 10 and 11 designate the motor and machine sides, respectively. A speed reducer is provided between these sides, and its spring constant and viscosity term are represented by Kc and Bk, respectively. Let it be supposed, that the inertia, viscosity coefficient, and position of the motor are Jm, Am and $\theta$, respectively, and the inertia and position (arm end position of the robot) of the machine are Jt and $\theta t$, respectively.

If the output torque of the motor is T, an equation of motion for the motor side 10 is given by $$T = J_m \cdot \ddot{\theta} + B_k(\dot{\theta} - \dot{\theta}_t) + K_c(\theta - \theta_t) + A_m \cdot \dot{\theta}. \quad (21)$$

Further, an equation of motion for the load side (machine side) 11 is given by $$0 = J_t \cdot \ddot{\theta}_t + B_k(\dot{\theta}_t - \dot{\theta}) + K_c(\theta_t - \theta). \quad (22)$$

Here $(\theta - \theta_t)$ represents a position deviation (torsion) of the load compared with the rotational position of the rotor of the motor, while $(\dot{\theta} - \dot{\theta}_t)$ represents a speed deviation (torsional speed). Let us suppose that the position deviation (torsion) and the speed deviation (torsional speed) are $\epsilon tf$ and $\dot{\epsilon} tf$, respectively, then, we have $$\theta - \theta_t = \epsilon tf,$$
$$\dot{\theta} - \dot{\theta}_t = \dot{\epsilon} tf. \quad (23)$$

If the quotient obtained by dividing equation (22) by Jt is subtracted from the quotient obtained by dividing equation (21) by Jm, we obtain the following equation:

$$T/J_m = \ddot{\epsilon} tf + 2\{(B_k/J_m) + (B_k/J_t)\}\dot{\epsilon} tf + \{(K_c/J_m) + (K_c/J_t)\} \cdot \epsilon tf + (A_m/J_m)\dot{\theta}. \quad (24)$$

From the above equation (24), we obtain $$\ddot{\epsilon} tf = -\{(B_k/J_m) + (B_k/J_t)\}\dot{\epsilon} tf \quad (25)$$
$$- \{(K_c/J_m) + (K_c/J_t)\} \cdot \epsilon tf -$$
$$- (A_m/J_m)\dot{\theta} + T/J_m.$$

Thereupon, solving equation (21) with respect to $\ddot{\theta}$, and substituting equation (23), we obtain $$\ddot{\theta} = -(B_k/J_m)\dot{\epsilon} tf - (K_c/J_m)\epsilon tf - (A_m/J_m)\dot{\theta} + T/J_m. \quad (26)$$

If we have
$\dot{\epsilon} tf = X1$,
$\epsilon tf = X2$, and
$\dot{\theta} = X3$,
the following state transition matrix can be obtained from the aforesaid equations (25) and (26).

$$\frac{d}{dt}\begin{bmatrix} X1 \\ X2 \\ X3 \end{bmatrix} = \quad (27)$$

$$\begin{bmatrix} -\left(\frac{Bk}{Jm} + \frac{Bk}{Jt}\right) & -\left(\frac{Kc}{Jm} + \frac{Kc}{Jt}\right) & -\frac{Am}{Jm} \\ 1 & 0 & 0 \\ \frac{Bk}{Jm} & \frac{Kc}{Jm} & \frac{Am}{Jm} \end{bmatrix}$$

$$\begin{bmatrix} X1 \\ X2 \\ X3 \end{bmatrix} + \begin{bmatrix} \frac{1}{Jm} \\ 0 \\ \frac{1}{Jm} \end{bmatrix} \cdot T$$

Among the state variables X1 to X3, an observable state variable is X3 indicative of the motor speed $\dot{\theta}$. Accordingly, if we have $$Y = [001][X1\, X2\, X3]^T, \quad (28)$$

and if a matrix relating to the matrix (X1, X2, X3) of equation (27), a matrix relating to T, and a matrix relating to the matrix (X1, X2, X3) of equation (28) are $\underline{A}$, $\underline{B}$ and $\underline{C}$, respectively, and this system is performed $\underline{Z}$ transformation, equations (27) and (28) are transformed as follows:

$$\underline{X}(n+1) = \underline{Az} \cdot \underline{X}(n) + \underline{Bz} \cdot T \quad (29)$$

$$\underline{Y} = \underline{C} \cdot \underline{X}(n). \quad (30)$$

where $\underline{X}(n) = [X1(n)\, X2(n)\, X3(n)]^T$.

If a homogeneous-dimension observer is set up with use of $\underline{X}'(n)$ as an estimated value of $\underline{X}(n)$, we obtain $$\underline{X}'(n+1) = (\underline{Az} - \underline{K} \cdot \underline{C})\underline{X}'(n) + \underline{Bz} \cdot T + \underline{K} \cdot Y. \quad (31)$$

By making a computation according to this equation (31) (various elements of the matrixes $\underline{A}$, $\underline{B}$ and $\underline{C}$ are known), an $\underline{X1}(n)$ is estimated to obtain
$X1 = \dot{\epsilon} tf$, and
$X2 = \epsilon tf$.
$\underline{K}$ is selected so that $(\underline{Az} - \underline{K} \cdot \underline{C})$ is stable.

Then, $\dot{\epsilon} t$ and $\epsilon t$ are obtained by subjecting $\dot{\epsilon} tf$ and $\epsilon tf$, obtained by the observer processing, to filtering processing using the transfer function $(S+Kp)/(S+A)$.

$$\epsilon t = \epsilon tf \cdot (S+Kp)/(S+A), \quad (32)$$

$$\dot{\epsilon} t = \dot{\epsilon} tf \cdot (S+Kp)/(S+A). \quad (33)$$

If the values $\dot{\epsilon} t$ and $\epsilon$ are obtained in this manner, the command torque $\tau$ for the motor can be obtained.

The vibration damping effect of the adaptive sliding mode control, in which the positions of the motor and moving part of the machine are fed back to the phase plane of the sliding mode, will be demonstrated as to a case of the spring model of a robot.

If we consider the case of the phase plane Suf whose value is 0, we obtain from equation (1)

$$0 = \dot{\epsilon} + Kp \cdot \epsilon - K1 \cdot \epsilon t. \quad (34)$$

Substituting equations (3), (32) and (23) into equation (34) and rearranging the resulting equation after Laplace transformation, we obtain $$0 = (S+A)\theta r - (S+A+K1)\theta + K1 \cdot \theta t. \quad (35)$$

On the other hand, rearranging the aforesaid equation (22) after Laplace transformation, we obtain $$\theta t/\theta = (Bk \cdot S + Kc)/(Jt \cdot S^2 + Bk \cdot S + Kc). \quad (36)$$

Since both the viscosity term Bk and the spring constant Kc of the robot are small, in this case, it is evident from equation (36) that not only the damping performance is low, but the robot undergoes low-frequency vibration.

Obtaining $\theta$ from equation (35), substituting it into equation (36), and rearranging the resulting equation, we set up $$\theta t/\theta r = (Bk \cdot S + Kc)/\{Jt \cdot S^2 + Bk \cdot S + Kc + (S^2 \cdot K1 \cdot Jt)/(-S+A)\}. \tag{37}$$

If A, in this equation (37), is reduced to A=0, or more specifically, to a value such that (S+A) can be regarded as equal to S in terms of the resonance frequency of the spring system (robot), equation (37) is transformed into the following equation (38).

$$\theta t/\theta r = (Bk \cdot S + Kc)/\{Jt \cdot S^2 + (Bk + K1 \cdot Jt)S + Kc\} \tag{38}$$

This equation (38) indicates that the product (K1·Jt) of the feedback gain K1 of the difference between the motor position and the distal end position of the robot and the machine inertia Jt is included in the damping term, so that the damping term is large enough to produce the vibration-damping effect.

Figure 1:
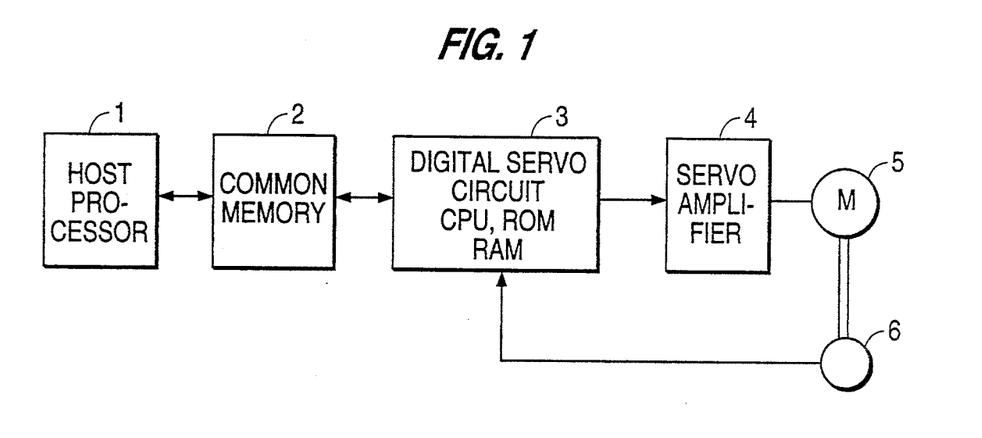
FIG. 1 is a block diagram of a servo control system for carrying out one embodiment of the present invention.

FIG. 1 is a block diagram showing the principal part of a robot control system for carrying out one embodiment of the present invention. In this figure, numeral 1 denotes a host processor for controlling the robot. The host processor 1 not only performs interpolation, conversion or reverse conversion of coordinate values in a rectangular coordinate system into or from rotational angles of individual axes, etc., but distributes a position command to each axis of the robot. Numeral 2 denotes a common RAM which mediates between the host processor 1 and a processor of a digital servo circuit 3 in transferring information. That is, the common RAM 2 delivers position commands and other data written by the host processor 1 to the processor of the digital servo circuit 3, and delivers alarm information and the like written by the processor of the digital servo circuit 3 to the host processor. Numeral 3 denotes the digital servo circuit 3, which is formed of a digital signal processor and the like including a processor, ROM, RAM, etc., and controls servomotors for the individual axes of the robot, thereby executing the sliding mode control processing and the observer processing according to the present invention. Numeral 4 denotes a servo amplifier formed of a transistor inverter or the like, and 5 denotes a servomotor. Further, numeral 6 denotes a pulse coder for detecting the position $\theta$ of the servomotor 5. The position $\theta$ is fed back to the digital servo circuit. For each of the servo amplifier 4 and servomotor 5, only one axis is shown in the figure.

Figure 3:
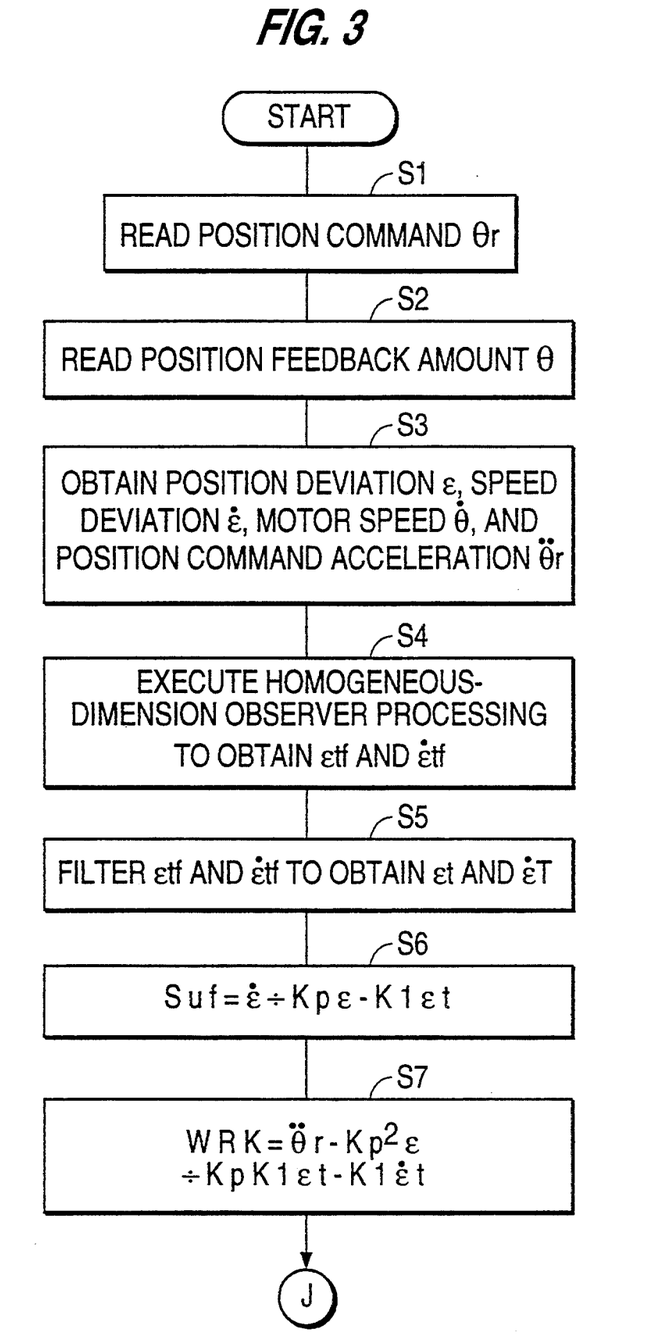
FIG. 3 is a part of a flow chart showing a processing executed by a processor of a digital servo circuit for every predetermined period according to one embodiment of the present invention.
Figure 4:
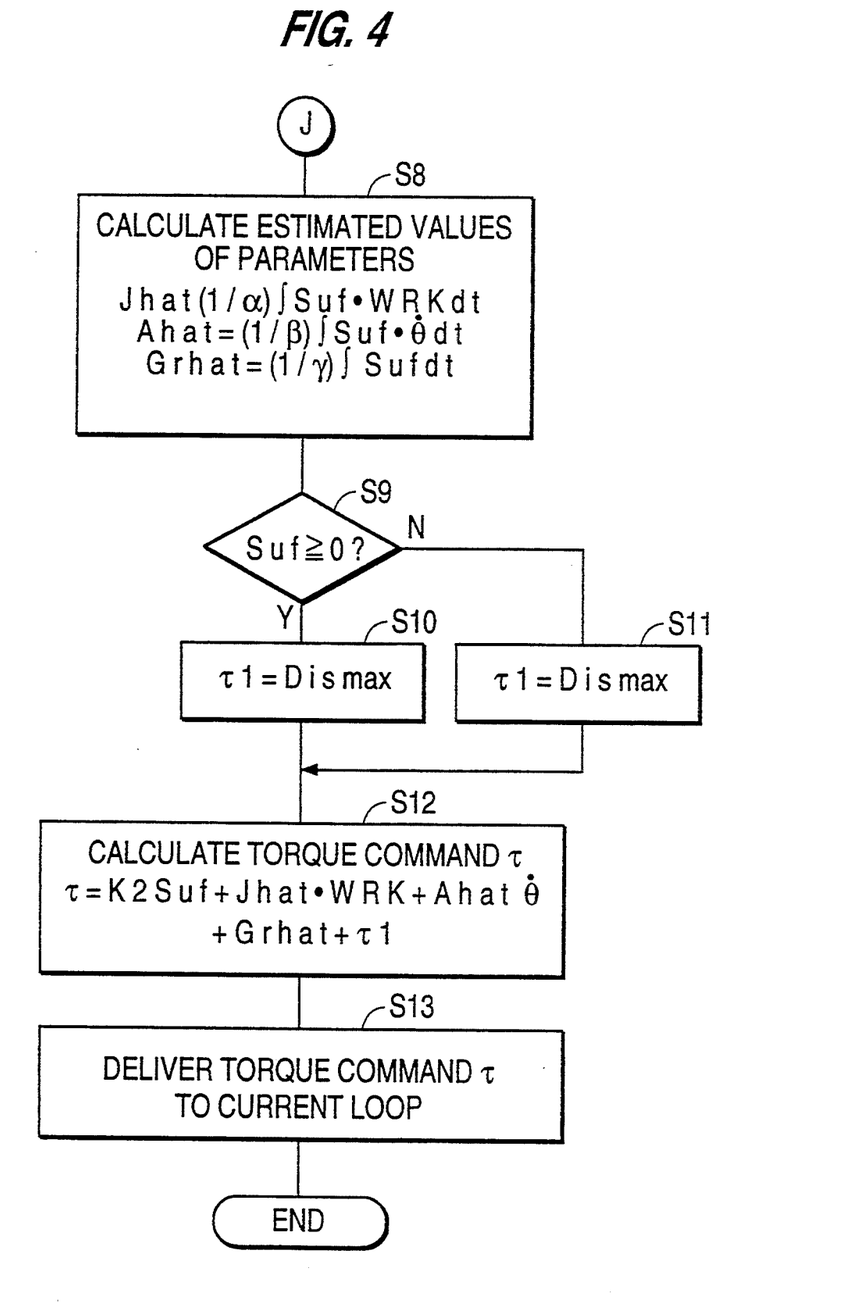
FIG. 4 is a continuation of the flow chart of FIG. 3.

FIGS. 3 and 4 are flow charts relating to a servomotor control processing of the present invention to be executed by the processings of the digital servo circuit according to the present embodiment. This processor executes the processings shown in FIGS. 3 and 4 in every predetermined period.

First, necessary constants and the like for the sliding mode control processing and observer processing, i.e., the position loop gain Kp, torsion feedback gain K1, maximum value Dis(max) and minimum value Dis(min) of the disturbance, maximum value J(max) of the inertia of the motor and machine, value of the constant K2 equivalent to the product of the maximum value J(max) of the inertia and the position loop gain Kp, motor inertia Jm, adjustment parameters $\alpha$, $\beta$ and $\gamma$, and values of the individual elements of the matrixes $\underline{A}$, $\underline{B}$ and $\underline{C}$, are set in advance.

When the operation of the robot is started, the host processor 1 distributes the position commands to the individual axes, while the processor of the digital servo circuit 3 reads the position command $\theta r$ from the common RAM 2, and also reads a position feedback amount $\theta$ delivered from the pulse coder 6 (Steps S1 and S2).

Then, the position deviation $\epsilon$ is obtained in accordance with the position command $\theta r$ and the position feedback amount $\theta$. More specifically, the position deviation $\epsilon$ is obtained by adding a value, obtained by subtracting the position feedback position $\theta$ from the position command $\theta r$, to a register in which the position deviation is stored. Further, the motor speed (first-order differential of motor position $\theta$) $\dot{\theta}$ is obtained by subtracting the feedback position detected in the preceding period from the detected feedback position $\dot{\theta}$. Furthermore, the speed deviation $\dot{\epsilon}$ is obtained by subtracting the aforesaid motor speed from the command speed $\dot{\theta}r$ (first-order differential of position command $\theta r$) equivalent to a value obtained by subtracting the position command for the preceding period from the position command $\theta r$, and the command acceleration (second-order differential of position command $\theta r$) $\ddot{\theta}r$ is obtained by subtracting the command speed obtained ill the preceding period from the obtained command speed $\dot{\theta}r$ (Step S3).

Subsequently, the aforesaid observer processing is executed on the basis of the motor speed $\dot{\theta}$, whereby the estimated torsion $\hat{\epsilon}tf$ and the estimated torsional speed $\dot{\epsilon}tf$ between the motor and the distal end of the robot are obtained (Step S4). Then, computations are made according to equations (32) and (33) to effect filtering processing, whereby a filtered estimated torsion $\epsilon t$ and a filtered estimated torsional speed $\dot{\epsilon}t$ between the motor and the distal end of the robot are obtained (Step S5). The computation by equation (1) is made in accordance with the position deviation $\epsilon$ and the speed deviation $\dot{\epsilon}$, which are obtained in Step S3, and the filtered estimated torsion $\epsilon t$ between the motor and the distal end of the robot obtained in Step S5, whereby the phase plane Suf is obtained (Step S6). Then, in order to obtain the torque command $\tau$ for the motor, a value relating to the estimated value Jhat of the inertia of equation (4) is obtained in accordance with the position deviation $\epsilon$ and the position command acceleration $\ddot{\theta}r$, which are obtained in Step S3, and the estimated torsion $\epsilon t$ and the estimated torsional speed $\dot{\epsilon}t$, which are obtained in Step S5, and this value is stored as WRK in the register (Step S7). More specifically, a computation is made according to the following equation.

$$WRK = \ddot{\theta}r - Kp^2\epsilon + Kp \cdot K1 \cdot \epsilon t - K1 \cdot \dot{\epsilon}t. \tag{39}$$

Subsequently, equations (15), (16) and (17) are integrated in accordance with the respective values of the phase plane Suf and WRK respectively obtained in Steps S6 and S7, whereby the estimated value Jhat of the inertia term, the estimated value Ahat of the coefficient of dynamic friction, and the estimated value Grhat of the gravity term are obtained (Step S8). More specifically, value of Suf·WRK is calculated at every period, and the calculated values are integrated in an accumulator, whereby the estimated value Jhat of the inertia term is obtained by multiplying the integrated value by a factor (1/$\alpha$). Likewise, the value of Suf·$\dot{\theta}$ is obtained and integrated in an accumulator to estimate Ahat, the value of coefficient of dynamic friction by multiplying the integrated value by a factor (1/$\beta$).

Further, the estimated value Grhat of the gravity term is obtained by multiplying the value of Suf, which is integrated in the accumulator, by a factor (1/$\gamma$).

Then, it is determined whether or not the value of the phase plane Suf is smaller than 0 (Step S9). If not smaller than 0, Dis(max) is stored in the register as the switching input τ1, and if negative, Dis(min) is stored (Steps S10 and S11). The torque command τ for the motor is obtained by making the computation by equation (4) (Step S12), and the computed torque command τ is delivered to a current loop (Step S13), whereupon the processing for the processing period concerned is finished.

Thereafter, the processor of the digital servo circuit 3 executes the aforesaid processing for each period, thereby controlling the servomotor to drive the robot.

Figure 5:
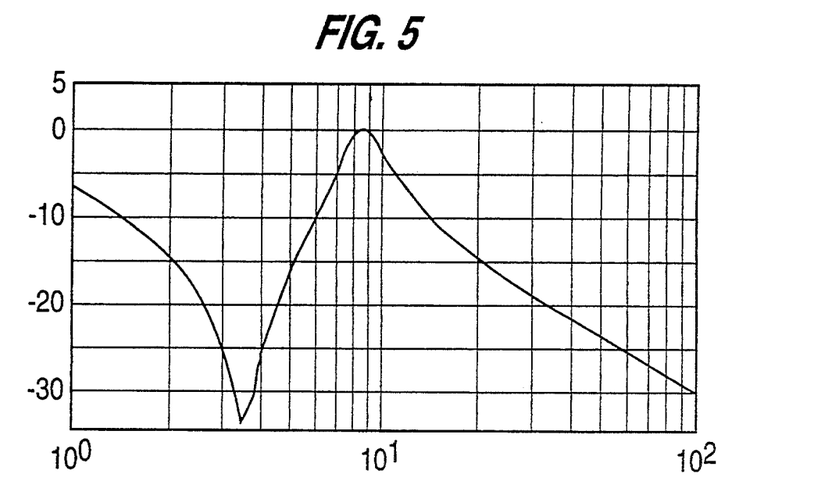
FIG. 5 is a diagram showing the frequency characteristic of a model for a simulation conducted to observe the effects of the present invention.
Figure 6A:
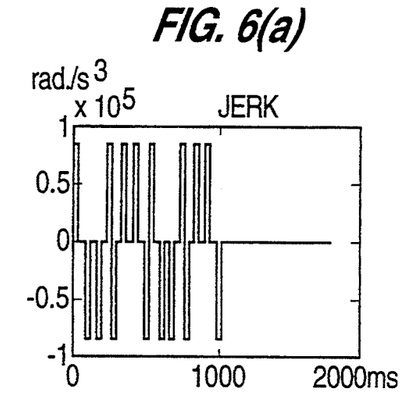
FIGS. 6(a)-(d) are diagrams illustrating input waveforms for the simulation.
Figure 6B:
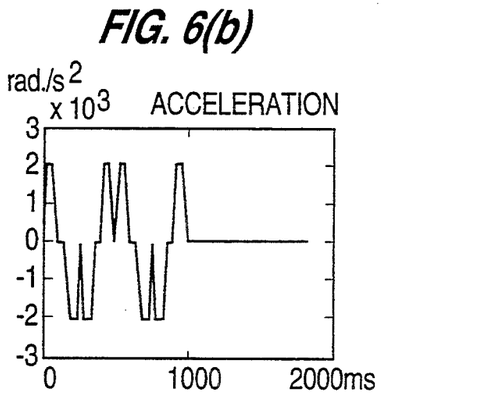
Figure 6C:
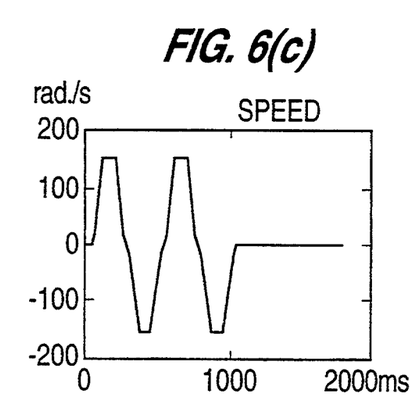
Figure 6D:
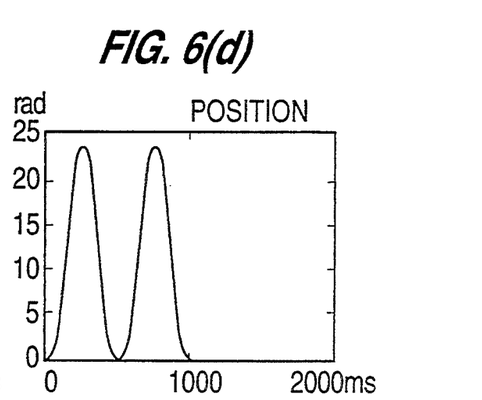
Figure 7A:
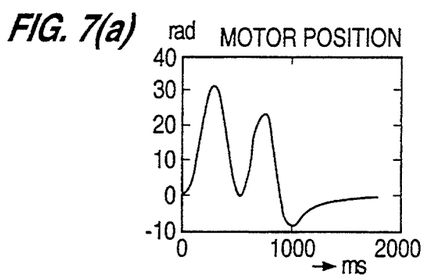
FIGS. 7(a)-(h) are diagrams illustrating waveforms for individual data obtained when a method according to the present invention is not applied to the simulation.
Figure 7B:
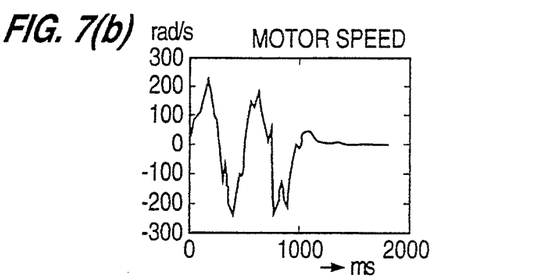
Figure 7C:
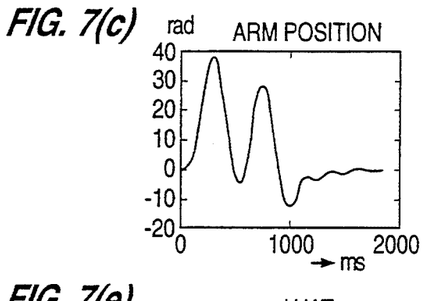
Figure 7D:
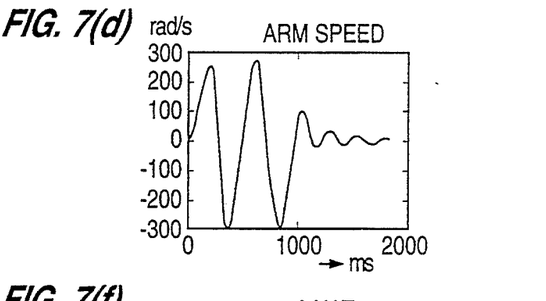
Figure 7E:
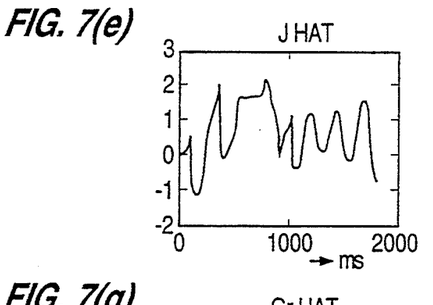
Figure 7F:
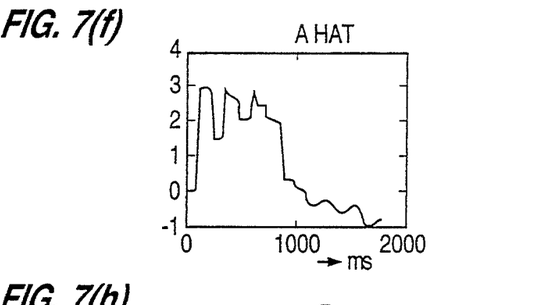
Figure 7G:
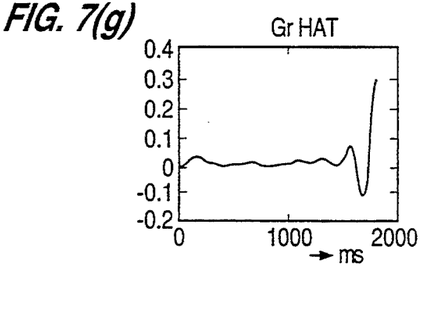
Figure 7H:
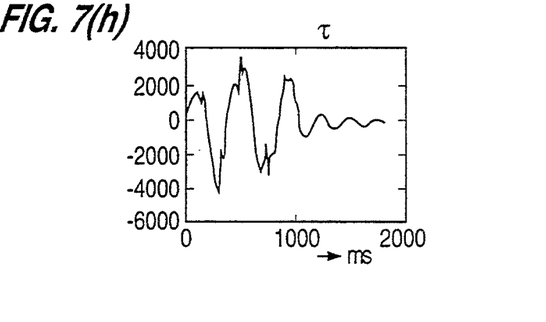
Figure 8A:
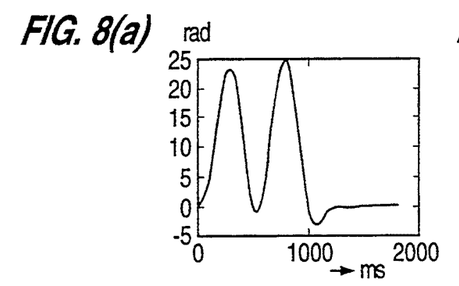
FIGS. 8(a)-(h) are diagrams illustrating waveforms for individual data obtained when the present invention is applied to the simulation.
Figure 8B:
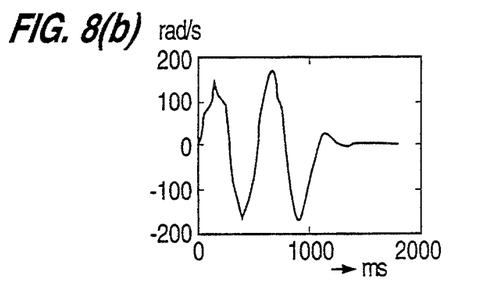
Figure 8C:
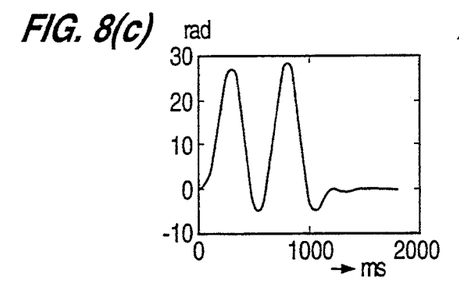
Figure 8D:
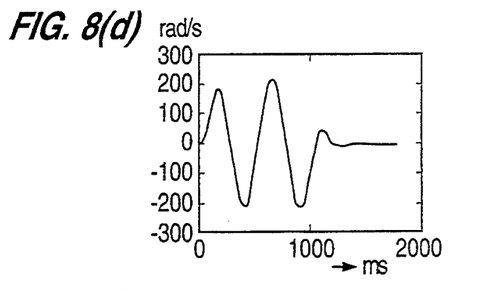
Figure 8E:
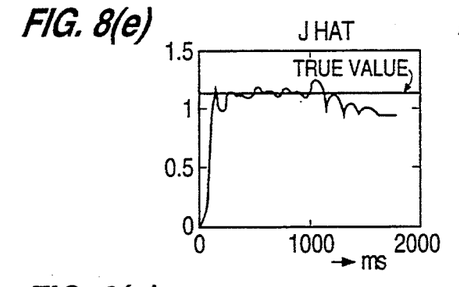
Figure 8F:
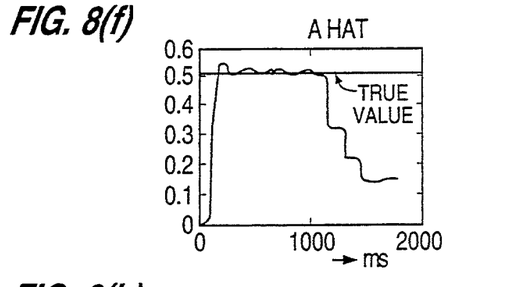
Figure 8G:
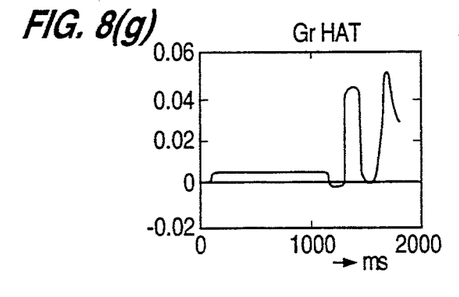
Figure 8H:
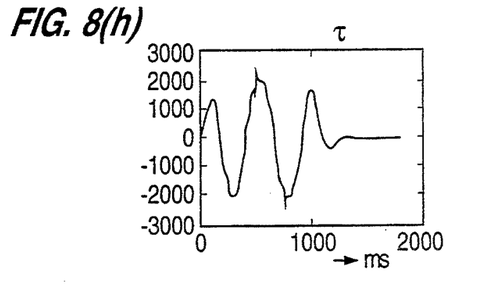

FIGS. 5 to 8 are diagrams showing simulation data used to observe the effects of the present invention. FIG. 5 is a diagram showing the frequency response of a model spring system. FIGS. 6(a)–(d) show input waveforms for a simulation, in which FIGS. 6(a), (b), (c) and (d) illustrate the jerk, acceleration, speed, and position, respectively. FIGS. 7(a)–(h) show data indicative of simulation results obtained when the present invention is not applied, while FIGS. 8(a)–(h) show data indicative of simulation results obtained when the present invention is applied. In these drawings, (a) illustrates the motor position $\theta$; (b), motor speed $\dot\theta(1)$; (c), arm distal end position $\theta t$; (d), arm distal end position speed $\dot\theta t$; (e), estimated value Jhat of the inertia; (f), estimated value Ahat of the coefficient of dynamic friction; (g), estimated value Grhat of the gravity term; and (h), torque command τ for the motor.

Comparison between the arm distal end position and speed illustrated in (c) and (d) of FIGS. 7 and 8 indicates that vibration after positioning is smaller in the case where the present invention is applied (FIG. 8). Further, comparison between (e) to (g) of FIGS. 7 and 8 indicates that the estimated value Jhat of the inertia, estimated value Ahat of the coefficient of dynamic friction, and estimated value Grhat of the gravity term are substantially equal to true values when the present invention is applied.

In the adaptive sliding mode control according to the present invention, as described above, the difference between the position of the motor and the distal end position of the moving part driven by the motor can be fed back to the phase plane for sliding mode to improve the convergence of the parameters (inertia, coefficient of dynamic friction, and gravity term) of the object of control, so that vibration of the machine moving part can be reduced.

I claim:

1. An adaptive sliding mode control method for controlling a control object, including a spring system, being driven by a servomotor, said method comprising the steps of:
    feeding back a difference between a position of the servomotor and a position of a moving part of the control object driven by the servomotor, for determination of a phase plane used in sliding mode control, said phase plane having a value; and
    controlling a torque command for the servomotor so that the value of said phase plane converges to 0.

2. An adaptive sliding mode control method for controlling a control object, including a spring system, being driven by a servomotor, comprising the steps of:
    obtaining a phase plane Suf for use in sliding mode control in accordance with an equation:

$$Suf = \dot\epsilon + Kp \cdot \epsilon - K1 \cdot \epsilon t,$$

where:

ε is a position of deviation between a command position and a position of the servomotor;
$\dot\epsilon$ is a speed deviation;
εt is a difference between a position of the servomotor and a position of a moving part of the control object;
Kp is a position loop gain; and
K1 is a feedback gain of the difference between the position of the servomotor and the position of the moving part of the control object driven by said servomotor; and obtaining a torque command τ for the servomotor according to the following equation:

$$\tau = K2 \cdot Suf + Jhat(\ddot\theta r - Kp^2\epsilon + Kp \cdot K1 \cdot \epsilon t - K1 \cdot \dot\epsilon t) + Ahat \cdot \dot\theta + Grhat + \tau 1,$$

where:
Jhat, Ahat, and Grhat are estimated values of an inertia term, a coefficient of dynamic friction, and a gravity term, respectively;
$\dot\theta r$ and $\ddot\theta r$ are a position command speed and an acceleration, respectively;
$\dot\epsilon t$ is a differential of the difference between the position of the servomotor and the position of the moving part of the control object driven by the servomotor; and
τ1 is a switching input, said switching input being adjusted to a maximum value of a disturbance when the value of the phase plane Suf is not smaller than 0, and to a minimum value of the disturbance when the value of the phase plane Suf is smaller than 0.

3. An adaptive sliding mode control method for control object according to claim 2, further comprising the step of:
    obtaining the differential $\dot\epsilon t$ through observer processing, wherein said difference εt between the position of the servomotor and the position of the moving part of the object of control driven by said servomotor, and the differential $\dot\epsilon t$ thereof are obtained by observer processing.

4. A method for applying adaptive sliding mode control to a robot, including a spring system, being driven by a servomotor, comprising the steps of:
    (a) setting and entering, in a memory of a servo circuit coupled to the servomotor, selected constants required for sliding mode control processing and observer processing, and a maximum value Dis(max) and a minimum value Dis(min) of a foreseen disturbance;
    (b) starting the operation of the robot at an initial time, the robot operating for a time, said time being divided into periods, and reading a position command value θr and a position feedback amount θ for every period of said periods of time;
    (c) calculating a motor speed $\dot\theta$, a command speed $\dot\theta r$, a command acceleration $\ddot\theta r$, a position deviation ε equivalent to a difference between the position command value θr and the position feedback amount θ, and a speed deviation $\dot\epsilon$, based on the position command value θr and the position feedback amount θ;
    (d) executing the observer processing in accordance with the motor speed $\dot\theta$ obtained in step (b);
    (e) obtaining an estimated torsion εtf and an estimated torsional speed $\dot\epsilon tf$ between the servomotor and a distal end of the robot, and filter processing deviations based on a transfer function;

(f) obtaining a filtered estimated torsion $\epsilon t$ and a filtered estimated torsional speed $\dot{\epsilon}t$;

(g) obtaining a phase plane Suf having a value, in accordance with the position deviation $\epsilon$ and the speed deviation $\dot{\epsilon}$ obtained in step (c) and the filtered estimated torsion $\epsilon t$ between the servomotor and the distal end of the robot obtained in step (f);

(h) obtaining an estimated value Grhat of a gravity term in accordance with the phase plane Suf obtained in step (g); an estimated value Ahat of a coefficient of dynamic friction in accordance with the phase plane Suf and the motor speed $\dot{\theta}$ obtained in step (b); and an estimated value Jhat of an inertia term in accordance with the phase plane Suf, the position deviation $\epsilon$ and the command acceleration $\ddot{\theta}r$ obtained in step (c), and the estimated torsion $\epsilon t$ and the estimated torsional speed $\dot{\epsilon}t$ obtained in step (f);

(i) determining whether the value of the phase plane Suf obtained in step (g) is smaller than 0 so that a switching input $\tau 1$ can be adjusted to the maximum value Dis(max) of the foreseen disturbance inputted in step (a) when the value is not smaller than 0, and so that the switching input $\tau 1$ can be adjusted to the minimum value Dis(min) of the foreseen disturbance inputted in step (a) when the value is smaller than 0;

(j) obtaining a torque command $\tau$ for the servomotor in accordance with the motor speed $\theta$, position deviation $\epsilon$, and command acceleration $\ddot{\theta}r$, obtained in steps (b) and (c), the filtered estimated torsion $\epsilon t$ and the filtered estimated torsional speed $\dot{\epsilon}t$ between the motor and the distal end of the robot obtained in step (f), the phase plane Suf obtained in step (g), the estimated value Jhat of the inertia term, the estimated value Ahat of the coefficient of dynamic friction, and the estimated value Grhat of the gravity term which are obtained in step (h), and the switching input $\tau 1$ obtained in step (i); and (k) delivering the torque command, obtained in step (j), to a current loop of the servo circuit.

* * * * *

UNITED STATES PATENT AND TRADEMARK OFFICE
CERTIFICATE OF CORRECTION

PATENT NO. : 5,442,270
DATED : August 15, 1995
INVENTOR(S) : Tetsuaki et al

It is certified that error appears in the above-indentified patent and that said Letters Patent is hereby corrected as shown below:

On the title page: Item

[22] PCT Filed, delete "Jan.19.1993" and insert --Jan. 18,1993--

[30] Priority Data, delete "4-056344" and insert --56344--

[57] Abstract, line 6, delete "$\epsilon$" and insert --$\acute{\epsilon}$-- line 7, delete "Өr" and insert --$\ddot{Θ}$r-- line 9, delete "$\epsilon$t" and insert --$\acute{\epsilon}$t--

Col. 2, line 10, delete "dilference" and -- difference--.
Col. 3, line 61, delete double space.

Signed and Sealed this

Nineteenth Day of December, 1995

Attest:

BRUCE LEHMAN

*Attesting Officer*  *Commissioner of Patents and Trademarks*